(12) United States Patent
Kim (10) Patent No.: US 11,999,294 B2
(45) Date of Patent: Jun. 4, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventor: Youngbeom Kim, Bucheon-si (KR)

(73) Assignees: NDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/692,496

(22) Filed: Mar. 11, 2022

(65) Prior Publication Data
US 2022/0332247 A1    Oct. 20, 2022

(51) Int. Cl.
*B60Q 9/00* (2006.01)
*B60R 11/02* (2006.01)
*G08B 21/02* (2006.01)

(52) U.S. Cl.
CPC ............ *B60Q 9/00* (2013.01); *B60R 11/0247* (2013.01); *G08B 21/02* (2013.01)

(58) Field of Classification Search
CPC ........ G08B 21/02; G08B 21/24; G08B 21/22; B60Q 9/00; B60Q 5/005; B60R 11/0247; B60R 21/01512; B60R 21/01566; B60R 16/023; B60R 21/01542; G10K 11/1781; G10K 11/18; G10K 2210/121; G10K 2210/1282; H04R 1/403; B60Y 2302/03; B60Y 2400/30
See application file for complete search history.

(56) References Cited

U.S. PATENT DOCUMENTS

2018/0361925 A1* 12/2018 Rowell .................. B60Q 1/525
2020/0290567 A1*  9/2020 Funyak ................. B60R 25/102
2020/0383580 A1* 12/2020 Shouldice .......... A61B 5/02416

* cited by examiner

*Primary Examiner* — Brian Wilson
(74) *Attorney, Agent, or Firm* — Morgan, Lewis & Bockius LLP

(57) ABSTRACT

A vehicle includes a first speaker, a microphone, an output device, and a control device configured to output a first sound signal through the first speaker, receive a second sound signal through the microphone, identify whether there is an occupant in a rear seat of the vehicle based on the first sound signal and the second sound signal, and control the output device to output a warning sound based on the presence of the occupant in the rear seat.

18 Claims, 9 Drawing Sheets

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2021-0049686, filed on Apr. 16, 2021, in the Korean Intellectual Property Office, the disclosure of which is incorporated by reference herein in its entirety.

TECHNICAL FIELD

The disclosure relates to a vehicle and a control method thereof.

BACKGROUND

When a driver gets out of a vehicle, there are cases where the driver leaves a child in a rear seat of the vehicle and gets out of the vehicle, resulting in an accident. Accordingly, a rear occupant alert (ROA) technology has been developed that notifies that there are occupants remaining in a vehicle when a driver gets out of the vehicle.

The rear occupant alert technology is a technology in which when a driver gets out of a vehicle, the vehicle identifies whether there is a child in a rear seat of the vehicle, and prevents an accident by outputting a notification when there is a child in the rear seat of the vehicle.

In a conventional rear occupant alert technology, when a driver turns off the ignition of a vehicle and opens a door of a driver seat, the vehicle identifies whether there is a child in a rear seat of the vehicle through a sensor mounted on a headlining of the vehicle and displays a notification via a cluster in the vehicle.

In the conventional rear occupant alert technology, a separate ultrasonic sensor needs to be applied to the headlining of the vehicle. In addition, it may be necessary to additionally use a high-precision radar sensor to improve a recognition rate of an occupant in the vehicle. Therefore, when the conventional rear occupant alert technology is applied to a vehicle, the manufacturing cost of the vehicle may increase.

In addition, in the conventional rear occupant alert technology, as a driver gets out of a vehicle without seeing a notification from a cluster, the driver may not be aware that a child remains in a rear seat of the vehicle.

SUMMARY

It is an aspect of the disclosure to provide a vehicle capable of providing a new rear occupant alert function and a control method thereof.

For example, the vehicle and the control method thereof according to the disclosure may control a speaker and a microphone mounted on an existing vehicle to identify whether or not an occupant remains in a rear seat of the vehicle.

In addition, the vehicle and the control method thereof according to the disclosure may control a virtual engine sound system (VESS) so that a driver recognizes that an occupant remains in a rear seat of the vehicle through output of a sound.

Additional aspects of the disclosure will be set forth in part in the description which follows and, in part, will be obvious from the description, or may be learned by practice of the disclosure.

In accordance with an aspect of the disclosure, a vehicle includes a first speaker, a microphone, an output device, and a control device configured to output a first sound signal through the first speaker, receive a second sound signal through the microphone, identify whether there is an occupant in a rear seat of the vehicle based on the first sound signal and the second sound signal, and control the output device to output a warning sound based on the presence of the occupant in the rear seat.

The first sound signal may include a high frequency signal, and the second sound signal may be received based on the output of the first sound signal.

The control device may control to output the first sound signal through the first speaker based on an ignition off of the vehicle.

The vehicle may further include at least one sensor, wherein the control device may identify whether a door of a driver seat of the vehicle is opened through the at least one sensor, and control to output the first sound signal through the first speaker further based on the opening of the door.

The vehicle may further include at least one of a second speaker or a display device, wherein the control device may control to perform, based on the presence of the occupant in the rear seat, at least one of outputting a warning sound signal through the second speaker or outputting a warning message through the display device.

The output device may include a virtual engine sound system, and the control device may identify whether the open door of the driver seat is closed through the at least one sensor, and control the virtual engine sound system to output the warning sound further based on the closing of the open door of the driver seat.

The vehicle may further include a communication device, wherein the control device may control to transmit a warning message through the communication device based on the closing of the open door of the driver seat.

The control device may identify that the occupant is present in the rear seat based on at least one of a frequency band and a sound pressure level of the second sound signal.

The first sound signal may be a signal output at a first time point, and the second sound signal may be a signal received based on the output of the first sound signal, and the control device may output a third sound signal at a second time point through the first speaker, receive a fourth sound signal through the microphone based on the output of the third sound signal, and identify that the occupant is present in the rear seat based on a difference between the second sound signal and the fourth sound signal being out of a predetermined reference range.

The control device may identify that the occupant is present in the rear seat based on a frequency band of the second sound signal corresponding to a predetermined reference frequency band.

In accordance with an aspect of the disclosure, a control method of a vehicle includes outputting a first sound signal through a first speaker of the vehicle, receiving a second sound signal through a microphone of the vehicle, identifying whether there is an occupant in a rear seat of the vehicle based on the first sound signal and the second sound signal, and outputting a warning sound through an output device of the vehicle based on the presence of the occupant in the rear seat.

The first sound signal may include a high frequency signal, and the second sound signal may be received based on the output of the first sound signal.

The outputting of the first sound signal may be performed based on an ignition off of the vehicle.

The outputting of the first sound signal may be performed further based on a door of a driver seat of the vehicle being open.

The control method may further include performing, based on the presence of the occupant in the rear seat, at least one of outputting a warning sound signal through a second speaker of the vehicle or outputting a warning message through a display device of the vehicle.

The output device may include a virtual engine sound system, and the outputting of the warning sound through the output device of the vehicle may include identifying whether the open door of the driver seat is closed, and outputting the warning sound through the virtual engine sound system further based on the closing of the open door of the driver seat.

The control method may further include transmitting a warning message through a communication device of the vehicle based on the closing of the open door of the driver seat.

The identifying of whether there is an occupant in the rear seat may include identifying that the occupant is present in the rear seat based on at least one of a frequency band and a sound pressure level of the second sound signal.

The first sound signal may be a signal output at a first time point, and the second sound signal may be a signal received based on the output of the first sound signal, and the identifying of whether there is an occupant in the rear seat may include outputting a third sound signal at a second time point through the first speaker, receiving a fourth sound signal through the microphone based on the output of the third sound signal, and identifying that the occupant is present in the rear seat based on a difference between the second sound signal and the fourth sound signal being out of a predetermined reference range.

The identifying of whether there is an occupant in the rear seat may include identifying that the occupant is present in the rear seat based on a frequency band of the second sound signal corresponding to a predetermined reference frequency band.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Throughout the specification, like reference numerals refer to like elements. This specification does not describe all the elements of the embodiments, and duplicative contents between general contents or embodiments in the technical field of the disclosure will be omitted. The terms 'part,' 'module,' and 'device' used in this specification may be embodied as software or hardware, and it is also possible for a plurality of 'parts,' 'modules,' and 'devices' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the disclosure will be described in detail with reference to the accompanying drawings.

Figure 1:
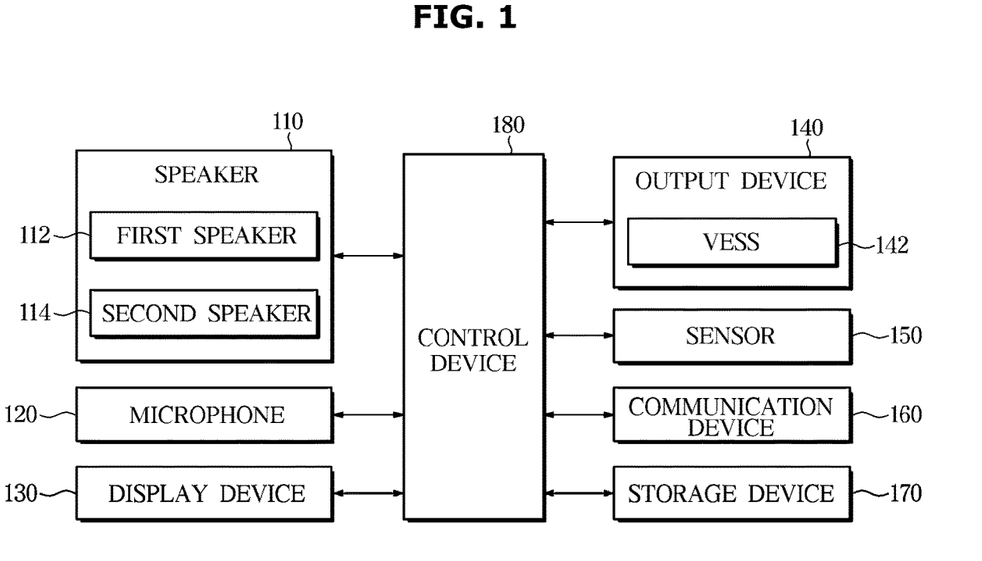
FIG. 1 is a block diagram of a vehicle according to an embodiment.
Figure 2:
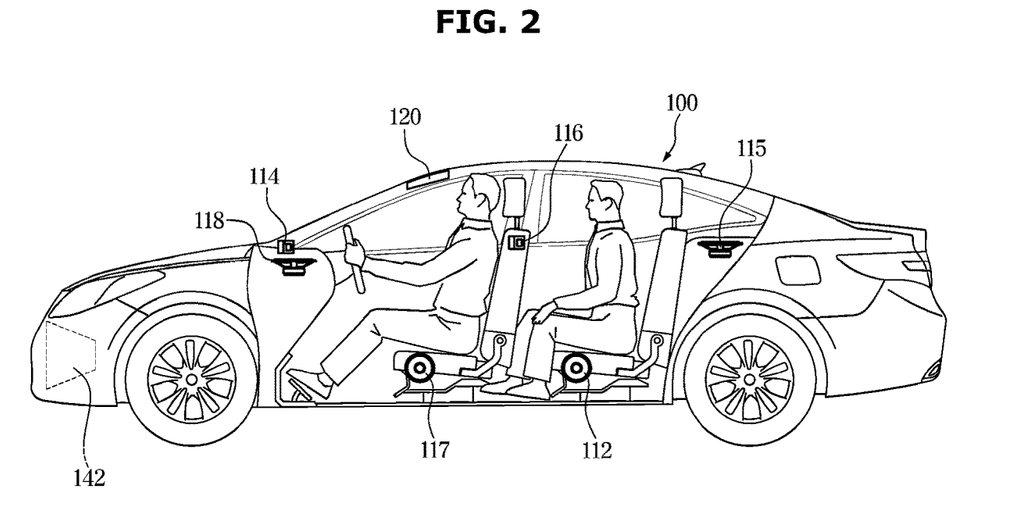
FIG. 2 is a view for explaining a configuration and operation of the vehicle according to an embodiment.

FIG. 1 is a block diagram of a vehicle 100 according to an embodiment, and FIG. 2 is a view for explaining a configuration and operation of the vehicle 100 according to an embodiment.

Referring to FIGS. 1 and 2, the vehicle 100 may include a speaker 110, a microphone 120, a display device 130, an output device 140, a sensor 150, a communication device 160, a storage device 170, and/or a control device 180.

The speaker 110 may output a sound signal.

One or a plurality of the speakers 110 may be provided, and for example, the speaker 110 may include a first speaker 112 and/or a second speaker 114.

Referring to FIG. 2, the first speaker 112 may be disposed around a rear seat inside the vehicle 100, and the second speaker 114 may be disposed on a center fascia portion of the vehicle 100. Also, the speaker 110 may further include third, fourth, fifth, and sixth speakers 115, 116, 117, and 118 disposed inside the vehicle 100.

The speaker 110 may output a general sound signal based on control of the control device 180. The speaker 110 may output a first sound signal, that is, a high frequency signal based on the control of the control device 180, that is, when the control device 180 identifies an ignition off of the vehicle 100 and a door opening of a driver seat through the sensor 150.

The microphone 120 may receive a sound signal, and may change the received sound signal into an electrical signal.

Referring to FIG. 2, the microphone 120 may be disposed at an upper end inside the vehicle 100.

The microphone 120 may enable a hands-free call of the driver or receive a voice of the driver based on the control of the control device 180.

The microphone 120 may receive a second sound signal, that is, a high frequency signal based on the control of the control device 180. For example, the microphone 120 may receive the second sound signal, that is, the high frequency signal in response to the first sound signal output by the speaker 110.

The microphone 120 may receive a human voice signal based on the control of the control device 180.

The display device 130 may display, for example, various contents (e.g., text, image, video, icon, and/or symbol). The display device 130 may include a touch screen, and may receive, for example, a touch input, a gesture, a proximity, or a hovering input using a part of a body of a user.

The output device 140 may output a predetermined warning sound. The output device 140 may include a virtual engine sound system (VESS) 142.

The virtual engine sound system 142 may artificially generate noise. For example, the virtual engine sound system 142 may include an external speaker (not shown) for outputting a sound to the outside of the vehicle 100, and may output a warning sound.

Referring to FIG. 2, the virtual engine sound system 142 may be disposed at a front portion of the vehicle 100.

One or a plurality of the sensors 150 may be provided, and may include a door sensor for detecting whether at least one door of the vehicle 100 is opened or closed.

The communication device 160 (also referred to as a communication circuit) may support establishment of a wireless and/or wired communication channel between an external device, for example, an electronic device (not shown) and/or a server (not shown) and performing communication through the established communication channel, and may include a communication circuit. For example, the communication device 160 may include a wired communication module (e.g., a power line communication module) and/or a wireless communication module (e.g., a cellular communication module, a Wi-Fi communication module, a short-range wireless communication module, and/or a global navigation satellite system (GNSS) communication module), and may communicate with an external device using a corresponding communication module among them.

The communication device 160 may include a communication circuit (also referred to as a transceiver) capable of performing a communication between components (also referred to as devices) of the vehicle 100, for example, a controller area network (CAN) communication and/or a local interconnect network (LIN) communication, through a vehicle communication network, and a control circuit for controlling an operation of the communication circuit.

The storage device 170 may store various data used by at least one component of the vehicle 100, for example, input data or output data for a software program and a command related thereto. The storage device 170 may include a memory, for example, a volatile memory and/or a nonvolatile memory.

The control device 180 (also referred to as a control circuit or processor) may control at least one other component (e.g., a hardware component or a software component (software program)) of the vehicle 100, and may perform various data processing and operations. The control device 180 may include a processor and a memory.

The control device 180 may identify a state of the vehicle 100 to identify the ignition off of the vehicle 100 and the opening of the door of the driver seat through the sensor 150.

The control device 180 may output the first sound signal, that is, the high frequency signal, through the first speaker 112 based on the identification of the ignition off of the vehicle 100 and the opening of the door of the driver seat.

The microphone 120 may receive the second sound, that is, the high frequency signal, based on the control of the control device 180.

The control device 180 may identify whether there is an occupant in the rear seat of the vehicle 100 by identifying a degree of attenuation of the high frequency signal and/or a frequency band of a human voice based on an analysis of the second sound.

When there is an occupant in the rear seat of the vehicle 100, the control device 180 may control the speaker 110, the display device 130, and/or the output device 140 to cause the driver to recognize that there is an occupant in the rear seat of the vehicle 100.

The operation of the control device 180 as described above may be an operation performed on an assumption that the closing of the door of the driver seat after the ignition of the vehicle 100 is turned off and the door of the driver seat is opened means that the driver of the vehicle 100 gets out of the vehicle 100.

The display device 140 described above may be included in an audio video navigation (AVN) device (not shown) of the vehicle 100. The AVN device may refer to a multimedia device in which audio, video, navigation, and/or telematics terminals are integrated into one. The AVN device may be provided on the center fascia of the vehicle 100, but is not limited thereto.

The position of each component of the vehicle 100 illustrated in FIG. 2 described above is one embodiment and may be changed when the vehicle 100 is manufactured.

Figure 3:
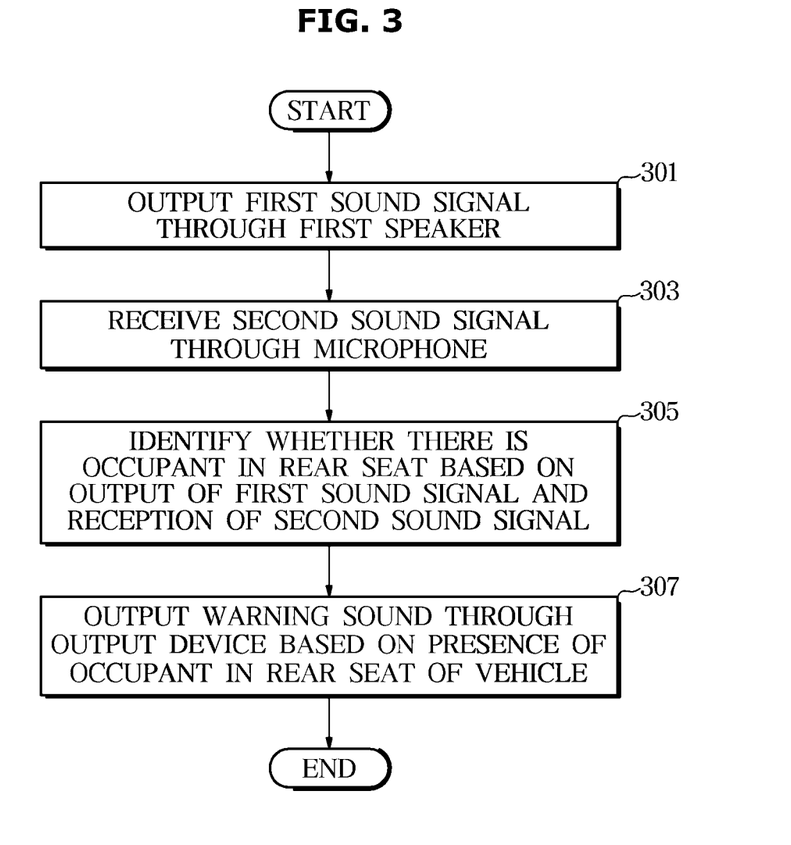
FIG. 3 is a flowchart of the operation of the vehicle according to an embodiment.

FIG. 3 is a flowchart of the operation of the vehicle 100 (and/or the control device 180 of the vehicle 100) according to an embodiment.

The vehicle 100 may output the first sound signal through the first speaker 112 (301).

The vehicle 100 may identify the ignition-off of the vehicle 100 and/or the opening of the door of the driver seat of the vehicle 100 through the sensor 150. The vehicle 100 may output the first sound signal through the first speaker 112 based on the ignition-off of the vehicle 100 and/or the opening of the door of the driver seat of the vehicle 100.

The vehicle 100 may receive the second sound signal through the microphone 120 (303).

The vehicle 100 may receive the second sound signal through the microphone 120 based on the output of the first sound signal.

The first sound signal may include a predetermined high frequency signal, for example, a high frequency sound (also referred to as a high-frequency sound source).

In general, a high frequency sound has a higher absorption rate than a low frequency sound. Accordingly, in a case where there is an occupant in the rear seat of the vehicle 100, when the vehicle 100 emits a high frequency sound through a rear-seat speaker, for example, the first speaker 112, a sound received through the microphone 120 is reduced because a high frequency sound has a higher absorption rate than a low frequency sound, so that it may be easy to determine whether there is an occupant in the rear seat of the vehicle 100.

The vehicle 100 may identify whether there is an occupant in the rear seat of the vehicle 100 based on the output of the first sound signal and the reception of the second sound signal (305).

The vehicle 100 may identify whether there is an occupant in the rear seat of the vehicle 100 based on at least one of a frequency band or a sound pressure level of the second sound signal.

For example, the second sound signal may be a signal received based on the output of the first sound signal. The vehicle 100 may identify that the frequency band of the second sound signal corresponds to a frequency band of the first sound signal and that the sound pressure level of the second sound signal corresponds to a predetermined sound pressure level.

Figure 4:
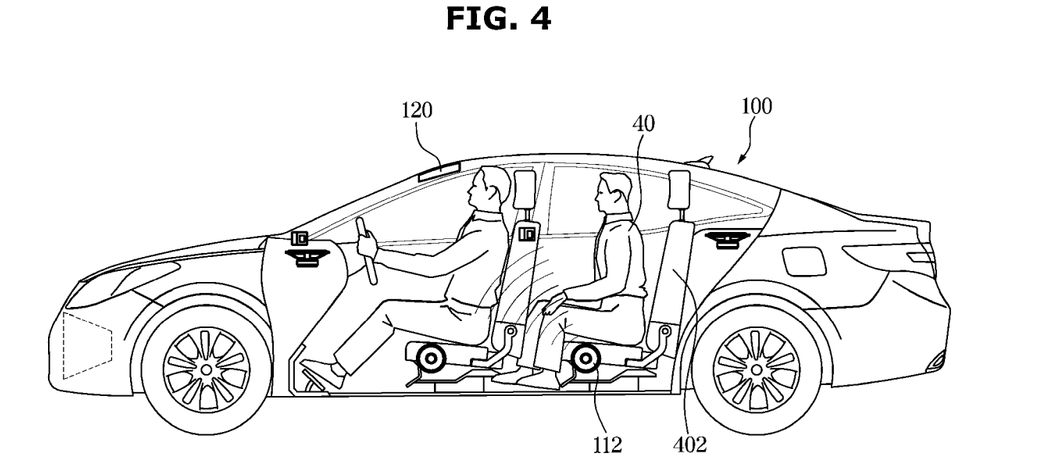
FIG. 4 is a view illustrating a case in which there is an occupant in a rear seat of the vehicle according to an embodiment.

The vehicle 100 may identify that there is an occupant in the rear seat of the vehicle 100 as illustrated in FIG. 4, based on the frequency band of the second sound signal corresponding to the frequency band of the first sound signal and the sound pressure level of the second sound signal corresponding to the predetermined sound pressure level.

FIG. 4 is a view illustrating a case in which there is an occupant 40 in a rear seat 402 of the vehicle 100 according to an embodiment.

Referring to FIG. 4, in a case in which there is the occupant 40 in the rear seat 402 of the vehicle 100, the first speaker 112 may be covered by a body of the occupant 40. In such a situation, when the vehicle 100 outputs the first sound signal, that is, a high frequency sound through the first speaker 112, the high frequency sound may be reflected, absorbed, and/or scattered.

In response thereto, the vehicle 100 may receive the second sound signal through the microphone 120 to identify that the frequency band of the second sound signal corresponds to the frequency band of the first sound signal and to identify that the sound pressure level of the second sound signal corresponds to a predetermined reference sound pressure level, that is, a sound pressure level of a sound signal received when there is the occupant 40 in the rear seat 402.

Figure 5:
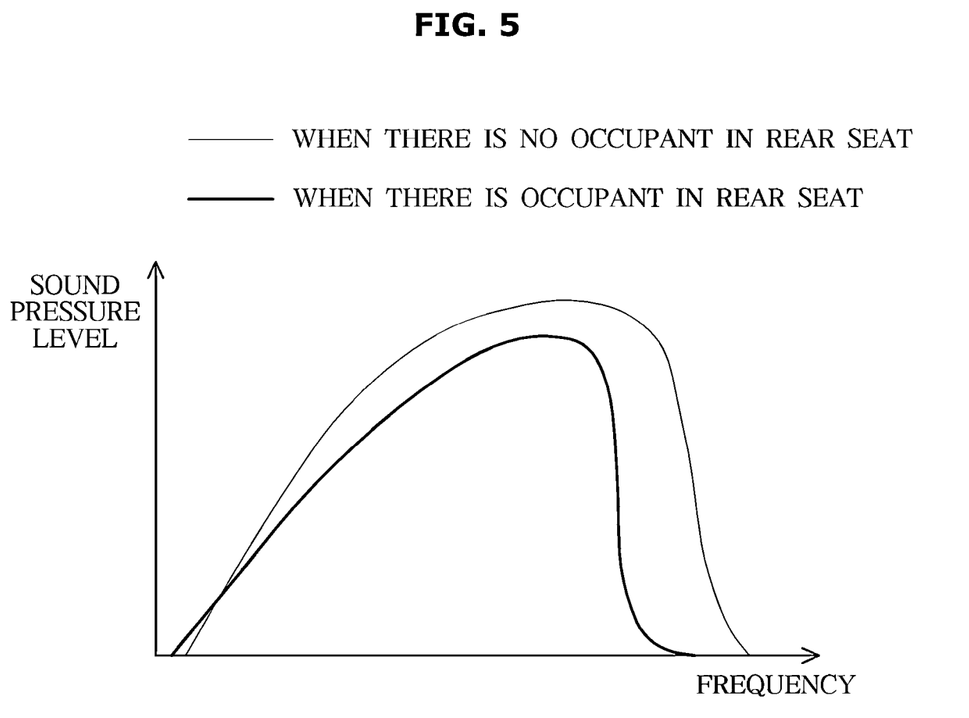
FIG. 5 is a graph illustrating a second sound signal received through a microphone when there is an occupant in the rear seat of the vehicle and when there is no occupant in the rear seat of the vehicle, according to an embodiment.

FIG. 5 is a graph illustrating the second sound signal received through the microphone 120 when there is the occupant 40 in the rear seat 402 of the vehicle 100 and when there is not the occupant 40 in the rear seat 402 of the vehicle 100, according to an embodiment.

Referring to FIG. 5, it may be seen that the sound pressure level of the sound signal received by the microphone 120 in the case where there is no occupant in the rear seat of the vehicle 100 is greater than that in the case where there is an occupant in the rear seat 402 of the vehicle 100.

For each of the case where there is no occupant in the rear seat 402 of the vehicle 100 and the case where there is an occupant in the rear seat 402, the vehicle 100 may preset a reference sound pressure level that is a reference for the vehicle 100 to identify the presence of an occupant in the rear seat 402 through the output of the first sound signal through the first speaker 112 and the sound pressure level identification of the second sound signal received through the microphone 120 in response thereto.

The vehicle 100 may output a warning sound through the output device 140 based on the presence of an occupant in the rear seat of the vehicle 100 (307).

The vehicle 100 may identify whether the open door of the driver seat of the vehicle 100 is closed through the sensor 150, and may output the warning sound through the output device 140 further based on the closing of the open door of the driver seat.

For example, the output of the warning sound through the output device 140 may include the output of the warning sound through the virtual engine sound system 142.

According to the above-described embodiment, the vehicle 100 may identify whether an occupant remains in the rear seat of the vehicle 100 based on the ignition off of the vehicle 100 and/or the opening of the door of the driver seat. Also, the vehicle 100 may provide a notification to the driver of the vehicle 100 based on the closing of the open door of the driver seat of the vehicle 100 in a state in which the occupant remains in the rear seat of the vehicle 100.

Accordingly, when the driver of the vehicle 100 leaves the occupant in the rear seat of the vehicle 100 and gets out of the vehicle 100, the driver may easily recognize that the driver has left the occupant in the rear seat of the vehicle 100 and got out of the vehicle 100.

In addition to the above-described embodiment, the vehicle 100 may transmit a warning message to the electronic device and/or server registered in the vehicle 100 through the communication device 160 further based on the closing of the open door of the driver seat.

Accordingly, even when the driver leaves an occupant in the rear seat of the vehicle 100 and gets out of the vehicle 100 and is located at a long distance from the vehicle 100, the driver may recognize that the driver has left the occupant in the rear seat of the vehicle 100 and got out of the vehicle 100.

Also, in addition to the above-described embodiment, the vehicle 100 may output a warning sound signal through the second speaker 114 of the vehicle 100 and/or a warning message through the display device 130 based on the presence of an occupant in the rear seat of the vehicle 100.

For example, the vehicle 100 may transmit the first sound signal through the first speaker 112 of the vehicle 100 based on the ignition off of the vehicle 100 and/or the opening of the door of the driver seat of the vehicle 100, and may receive the sound signal in response to the output of the first sound signal.

Also, the vehicle 100 may identify whether there is an occupant in the rear seat of the vehicle 100 based on the second sound signal, and when there is an occupant in the rear seat of the vehicle 100, may output the warning sound signal through the second speaker 114 and/or output the warning message through the display device 130.

Accordingly, the vehicle 100 may cause the driver to recognize that an occupant remains in the rear seat of the vehicle 100 without getting off the vehicle 100 before the driver gets out of the vehicle 100 in a state in which there is an occupant in the rear seat of the vehicle 100 and the ignition of the vehicle 100 is turned off and/or the door of the driver seat of the vehicle 100 is open.

The above-described embodiment illustrates that the second sound signal corresponds to the first sound signal. However, in addition to the above-described embodiment, and/or in other embodiment, the second sound signal may include a human voice signal.

For example, the vehicle 100 may identify that the second sound signal received through the microphone 120 corresponds to the human voice signal. The vehicle 100 may identify that there is an occupant in the rear seat of the vehicle 100 based on the correspondence between the second sound signal received through the microphone 120 and the human voice signal.

A frequency of the human voice signal includes a fundamental frequency between 100 Hz and 260 Hz and other harmonics.

Figure 6:
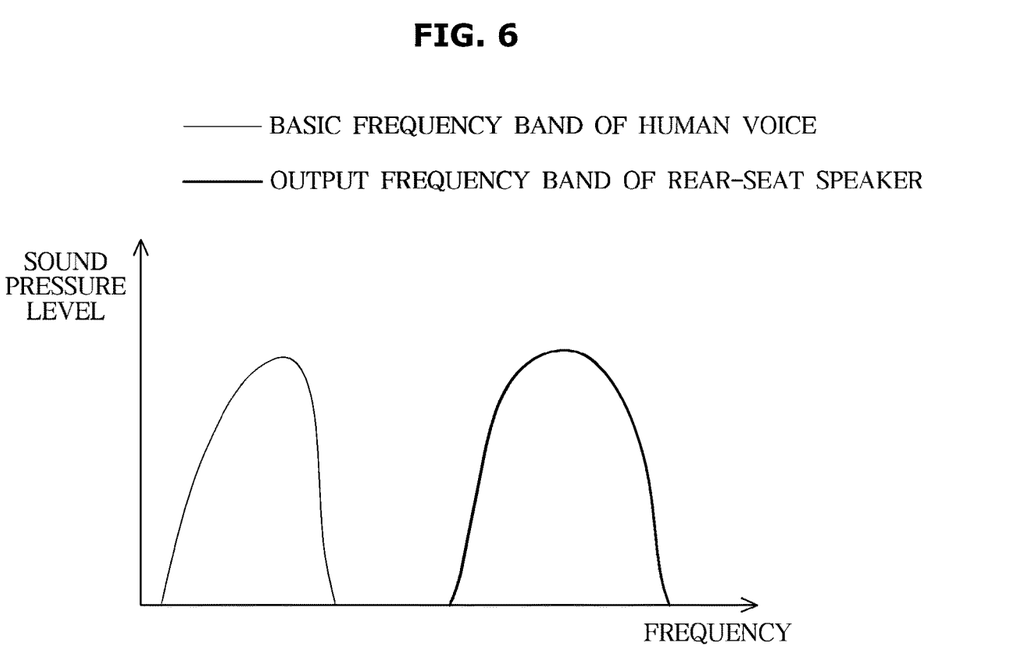
FIG. 6 is a graph illustrating a human voice signal and a first sound signal output through a first speaker according to an embodiment.

FIG. 6 is a graph illustrating the human voice signal and the first sound signal output through the first speaker 112 according to an embodiment.

Referring to FIG. 6, it may be seen that a basic frequency band of a human voice is different from a frequency band of the first sound signal output through the first speaker 112, that is, a high frequency signal. In addition, it may be seen that there is a large difference between a basic frequency of the human voice and the frequency band of the high frequency signal output through the first speaker 112, and the basic frequency of the human voice and the high frequency signal output through the first speaker 112 do not affect each other.

Accordingly, when a frequency band of the sound signal received through the microphone 120 corresponds to a predetermined reference frequency band, that is, a frequency band of a voice signal of a predetermined person, the vehicle 100 may identify that there is an occupant in the rear seat of the vehicle 100.

The above-described embodiment illustrates that the vehicle 100 identified that there is an occupant in the rear seat of the vehicle 100 based on the second sound signal received based on the output of the first sound signal. However, in addition to the above-described embodiment, and/or in other embodiment, the vehicle 100 may output a plurality of sound signals through the first speaker 112 to identify whether or not there is an occupant in the rear seat of the vehicle 100 based on the plurality of sound signals received through the microphone 120.

For example, the above-described first sound signal may be a signal output at a first time point.

Also, the vehicle 100 may output a third sound signal at a second time point after the first time point through the first speaker 112, and may receive a fourth sound signal through the microphone 120 based on the output of the third sound signal.

The vehicle 100 may identify a difference between the sound pressure level of the second sound signal received based on the output of the first sound signal at the first time point and a sound pressure level of the fourth sound signal received based on the output of the third sound signal at the second time point.

The vehicle 100 may identify that there is an occupant in the rear seat based on the difference between the sound pressure level of the second sound signal and the sound pressure level of the fourth sound signal being out of a predetermined reference range.

Figure 7:
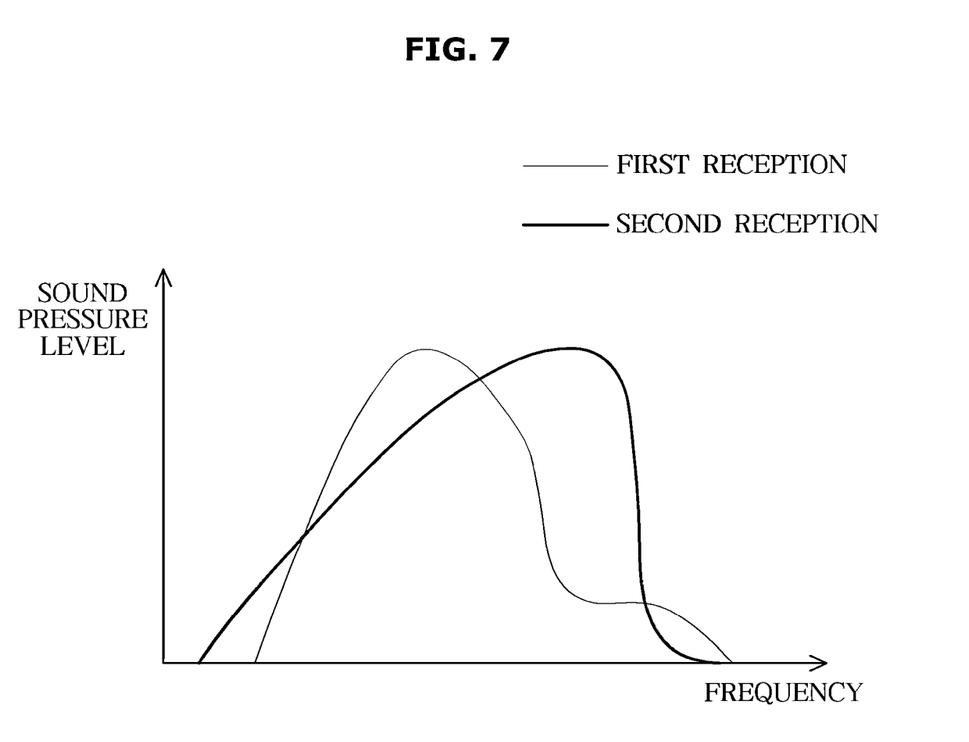
FIG. 7 is a graph illustrating two sound signals sequentially received through the microphone of the vehicle according to an embodiment.

Assuming that the occupant moves in the rear seat of the vehicle 100, when the vehicle 100 sequentially outputs sound signals through the first speaker 112, signal waveforms as illustrated in FIG. 7 may be output as reflection and/or absorption rate of sound signals received through the microphone 120 is changed by the movement of the occupant.

FIG. 7 is a graph illustrating two sound signals sequentially received through the microphone 120 of the vehicle 100 according to an embodiment.

Referring to FIG. 7, it may be seen that, due to the movement of the occupant in the rear seat of the vehicle 100, the sound signal first received by the microphone 120 and the sound signal received thereafter by the microphone 120 are different from each other.

Accordingly, the vehicle 100 may compare sound pressure levels of the two sound signals received through the microphone 120, that is, the sound pressure level of the second sound signal and the sound pressure level of the fourth sound signal, and may identify that the occupant is moving in the rear seat of the vehicle 100 when the sound pressure level of the second sound signal and the sound pressure level of the fourth sound signal are different from each other.

For example, when the difference between the sound pressure level of the second sound signal and the sound pressure level of the fourth sound signal is out of the predetermined reference range, the vehicle 100 may identify that an occupant is moving in the rear seat of the vehicle 100, and thus there is an occupant in the rear seat of the vehicle 100.

Figure 8:
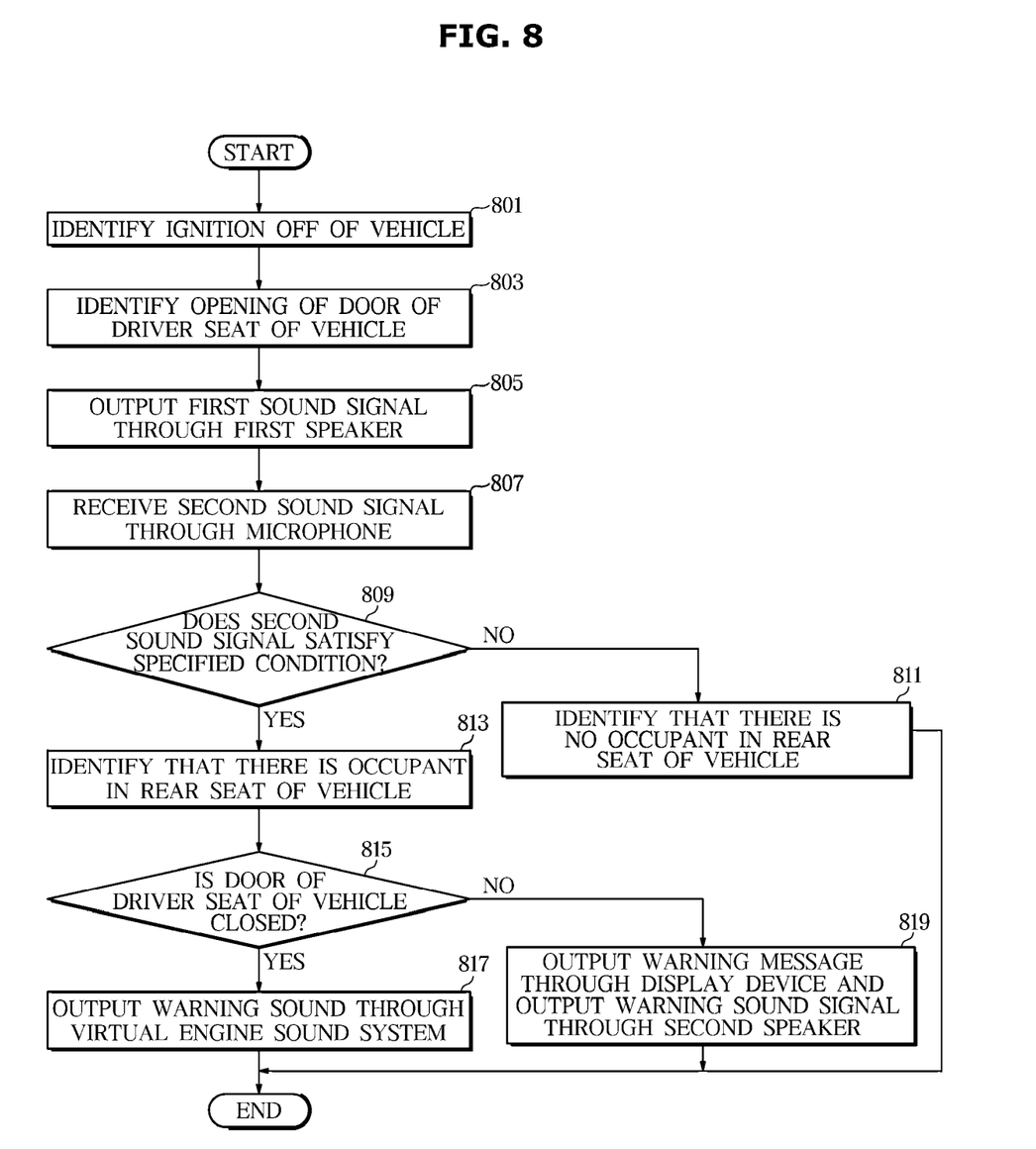
FIG. 8 is a flowchart of the operation of the vehicle according to an embodiment.
Figure 9:
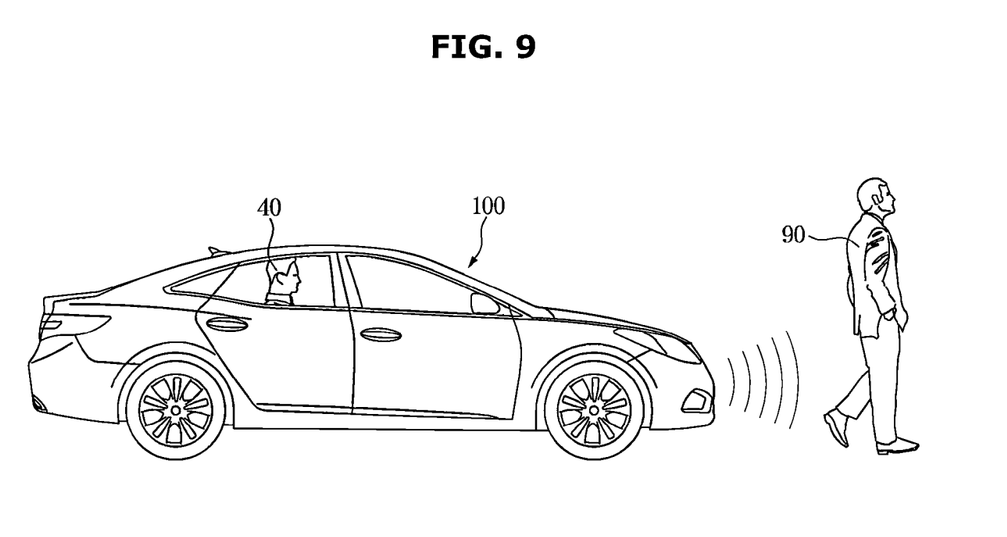
FIG. 9 is a view for explaining a control operation of the vehicle according to an embodiment.

FIG. 8 is a flowchart of the operation of the vehicle 100 (the control device 180 of the vehicle 100) according to an embodiment, and FIG. 9 is a view for explaining a control operation of the vehicle 100 according to an embodiment.

The vehicle 100 may identify the ignition off of the vehicle 100 (801).

The vehicle 100 may identify the opening of the door of the driver seat of the vehicle 100 through the sensor 150 of the vehicle 100 (803).

The vehicle 100 may output the first sound signal, for example, a high frequency signal, through the first speaker 112 (805).

The vehicle 100 may receive the second sound signal through the microphone 120 based on the output of the first sound signal (807).

The vehicle 100 may identify whether the second sound signal satisfies a specified condition (809).

The vehicle 100 may perform operation 813 when the second sound signal satisfies the specified condition, and may perform operation 811 when the second sound signal does not satisfy the specified condition.

The specified condition may include a first condition in which the frequency band of the second sound signal is included in a preset frequency band, for example, a frequency band range of the human voice, and/or a second condition in which the frequency band of the second sound signal corresponds to the frequency band of the first sound signal and corresponds to a preset sound pressure level.

For example, the vehicle 100 may perform operation 813 when the first condition and/or the second condition are satisfied, and may perform operation 811 when the first condition and the second condition are not satisfied.

The vehicle 100 may identify that there is no occupant in the rear seat of the vehicle 100 (811).

The vehicle 100 may identify that there is an occupant in the rear seat of the vehicle 100 (813).

The vehicle 100 may identify whether the door of the driver seat of the vehicle 100 is closed through the sensor 150 (815).

The vehicle 100 may perform operation 817 when the door of the driver seat of the vehicle 100 is closed, and may perform operation 819 when the door of the driver seat of the vehicle 100 is not closed.

The vehicle 100 may output the warning sound through the virtual engine sound system 142 (817).

For example, when the driver gets out of the vehicle 100 as illustrated in FIG. 9 in the state in which there is an occupant in the rear seat of the vehicle 100, the vehicle 100 may output the warning sound through a speaker of the virtual engine sound system 142.

The vehicle 100 may output the warning message through the display device 130 and output the warning sound signal through the second speaker 114 (819).

For example, the vehicle 100 may output the warning message such as "check the rear seat" through the display device 130, and may output the warning sound signal such as "check the rear seat" through the second speaker 114.

According to the above-described embodiments, when the driver turns off the ignition of the vehicle 100 and opens the door of the vehicle 100, assuming that a child is asleep in the rear seat of vehicle 100 and the driver forgets that there is the child in rear seat 402, the vehicle 100 may inform the driver that there is the child in the rear seat 402.

For example, when the driver opens the door of the driver seat, the vehicle 100 may output a high-frequency sound signal through the rear-seat speaker (e.g., the first speaker 112) of the vehicle 100. Because there is an occupant, that is, a child, in the rear seat of the vehicle 100, as the sound signal output through the rear-seat speaker is absorbed, reflected, and/or scattered by the occupant, the level applied to the microphone 120 is lowered. The vehicle 100 may compare the sound pressure level of the sound signal received through the microphone 120 with the sound pressure level applied to the microphone 120 when there is no occupant in the rear seat of the vehicle 100, and when the sound pressure level differs by more than a predetermined level, may output the warning message and the warning sound through the display device 130 of the cluster of the vehicle 100 and a front-seat speaker (e.g., the second speaker 114). The vehicle 100 may determine that the case in which the driver got out of the vehicle 100 without recognizing the warning message and the warning sound of the vehicle 100 is that the door of the driver seat of the vehicle 100 is closed, and when the door of the driver seat is closed, may control the virtual engine sound system 142 to inform that the occupant is present in the rear seat of the vehicle 100.

In addition, according to the above-described embodiment, assuming that a child is asleep in the rear seat of the vehicle 100, and the driver forgets that there is the child in rear seat 402 and enters a house without recognizing the warning sound of the virtual engine sound system 142, the vehicle 100 may notify the driver that the child is present in the rear seat 402.

For example, the vehicle 100 may periodically output the high-frequency sound signal for a predetermined time in order to identify whether there is an occupant in the rear seat of the vehicle 100, and may identify a change in the sound signal periodically received through the microphone 120.

When the occupant in the rear seat of the vehicle 100 moves, as the sound signal output through the rear-seat speaker (e.g., the first speaker 112) is absorbed, reflected, and/or scattered by the occupant, the sound pressure level of the sound signal applied to the microphone 120 may vary. The vehicle 100 may identify whether the occupant is present in the rear seat of the vehicle 100 while periodically identifying whether the sound signal received through the microphone 120 corresponds to a human voice frequency. Based on the change in the sound pressure level of the sound signal and/or the identification of whether the sound signal received through the microphone 120 corresponds to the human voice frequency, the vehicle 100 may output the warning sound through the virtual engine sound system 142, transmit the warning message to an electronic device of the driver through the communication device 160, and/or transmit a rescue request message to a server such as an emergency rescue sensor through the communication device 160.

Herein, the disclosed embodiments may be implemented in the form of a recording medium storing instructions executable by a computer. The instructions may be stored in the form of program code, and when executed by a processor (which may be included by the controller device 180), a program module may be created to cause the processor to perform the operations of the disclosed embodiments. The recording medium may be implemented as a non-transitory computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, a vehicle and a control method thereof according to an aspect of the disclosure can provide a rear occupant alert technology through a speaker and a microphone mounted in an existing vehicle.

For example, the vehicle and the control method thereof according to an aspect of the disclosure can provide a rear occupant alert function without additional devices of the vehicle, for example, an ultrasonic sensor and a laser sensor, thereby reducing the manufacturing cost of the vehicle.

Further, the vehicle and the control method thereof according to an aspect of the disclosure can notify a driver who gets out of the vehicle that an occupant remains in a rear seat of the vehicle, thereby improving awareness of the driver.

The embodiments disclosed with reference to the accompanying drawings have been described above. However, it will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a first speaker;
   a microphone;
   an output device; and
   a control device configured to output a first sound signal through the first speaker, receive a second sound signal based on the output of the first sound signal through the microphone, output a third sound signal with a time difference from the first sound signal through the first speaker, receive a fourth sound signal based on the output of the third sound signal through the microphone, identify whether there is an occupant in a rear seat of the vehicle based on a difference between a sound pressure level of the second sound signal and a sound pressure level of the fourth sound signal being out of a predetermined reference range, and control the output device to output a warning sound based on the presence of the occupant in the rear seat.

2. The vehicle according to claim 1, wherein
   the first sound signal comprises a high frequency signal with a higher absorption rate than a low frequency sound.

3. The vehicle according to claim 1, wherein
   the control device controls to output the first sound signal through the first speaker based on an ignition off of the vehicle.

4. The vehicle according to claim 3, further comprising at least one sensor,
   wherein the control device identifies whether a door of a driver seat of the vehicle is opened through the at least one sensor, and controls to output the first sound signal through the first speaker further based on the opening of the door.

5. The vehicle according to claim 4, further comprising at least one of a second speaker or a display device,
   wherein the control device controls to perform, based on the presence of the occupant in the rear seat, at least one of outputting a warning sound signal through the second speaker or outputting a warning message through the display device.

6. The vehicle according to claim 4, wherein
the output device comprises a virtual engine sound system, and
the control device identifies whether the open door of the driver seat is closed through the at least one sensor, and controls the virtual engine sound system to output the warning sound further based on the closing of the open door of the driver seat.

7. The vehicle according to claim 4, further comprising a communication device,
wherein the control device controls to transmit a warning message through the communication device further based on the closing of the open door of the driver seat.

8. The vehicle according to claim 1, wherein the control device further identifies that the occupant is present in the rear seat based on a frequency band the second sound signal.

9. The vehicle according to claim 1, wherein
the control device identifies that the occupant is present in the rear seat based on a frequency band of the second sound signal corresponding to a predetermined reference frequency band.

10. A control method of a vehicle comprising:
outputting a first sound signal through a first speaker of the vehicle;
receiving a second sound signal based on the output of the first sound signal through a microphone of the vehicle;
outputting a third sound signal with a time difference from the first sound signal through the first speaker;
receiving a fourth sound signal based on the output of the third sound signal through the microphone;
identifying whether there is an occupant in a rear seat of the vehicle based on a difference between a sound pressure level of the second sound signal and a sound pressure level of the fourth sound signal being out of a predetermined reference range; and
outputting a warning sound through an output device of the vehicle based on the presence of the occupant in the rear seat.

11. The control method according to claim 10, wherein the first sound signal comprises a high frequency signal with a higher absorption rate than a low frequency sound.

12. The control method according to claim 10, wherein the outputting of the first sound signal is performed based on an ignition off of the vehicle.

13. The control method according to claim 12, wherein the outputting of the first sound signal is performed further based on a door of a driver seat of the vehicle being open.

14. The control method according to claim 13, further comprising
performing, based on the presence of the occupant in the rear seat, at least one of outputting a warning sound signal through a second speaker of the vehicle or outputting a warning message through a display device of the vehicle.

15. The control method according to claim 13, wherein
the output device comprises a virtual engine sound system, and
the outputting of the warning sound through the output device of the vehicle comprises identifying whether the open door of the driver seat is closed, and outputting the warning sound through the virtual engine sound system further based on the closing of the open door of the driver seat.

16. The control method according to claim 13, further comprising
transmitting a warning message through a communication device of the vehicle further based on the closing of the open door of the driver seat.

17. The control method according to claim 10, wherein the identifying of whether there is an occupant in the rear seat further comprises identifying that the occupant is present in the rear seat based on a frequency band the second sound signal.

18. The control method according to claim 10, wherein
the identifying of whether there is an occupant in the rear seat comprises identifying that the occupant is present in the rear seat based on a frequency band of the second sound signal corresponding to a predetermined reference frequency band.

* * * * *